United States Patent [19]

Bright, Jr.

[11] 4,188,769
[45] Feb. 19, 1980

[54] MICROWAVE SEALING OF THERMOPLASTIC MATERIAL

[75] Inventor: Marvin L. Bright, Jr., Pauline, S.C.

[73] Assignee: W. R. Grace & Co., Duncan, S.C.

[21] Appl. No.: 898,744

[22] Filed: Apr. 21, 1978

[51] Int. Cl.² .................. B65B 31/04; B65B 51/22
[52] U.S. Cl. .................................. 53/434; 53/479; 156/272; 219/10.55 M
[58] Field of Search ............ 53/434, 477, 479, 512, 53/86, DIG. 2; 156/272; 219/10.55 R, 10.55 M

[56] References Cited

U.S. PATENT DOCUMENTS

| 3,358,905 | 12/1967 | Soesbergen | 53/479 X |
| 3,928,938 | 12/1974 | Burrell | 53/434 |
| 3,992,606 | 11/1976 | Arutt et al. | 53/DIG. 2 |
| 4,018,642 | 4/1977 | Pike et al. | 156/272 |

FOREIGN PATENT DOCUMENTS 2242831 3/1975 France .............................. 219/10.55 R Primary Examiner—Travis S. McGehee
Attorney, Agent, or Firm—John J. Toney; William D. Lee, Jr.; John B. Hardaway

[57] ABSTRACT

Microwave energy is used for sealing polymeric film material particularly the sealing of film material in the form of flexible containers.

11 Claims, 4 Drawing Figures

4,188,769

MICROWAVE SEALING OF THERMOPLASTIC MATERIAL

BACKGROUND OF THE INVENTION

This invention relates to sealing of thermoplastic material and more particularly to a process for sealing the gathered end of a thermoplastic bag so as to obtain an airtight seal.

A common method of sealing the open end of a thermoplastic container requires that opposite sides of the open mouth be brought together and that sufficient heat be applied to the thermoplastic material to fuse the two sides together. This necessarily results in a rather wide closure extending the width of the package which, while suitable for packaging some products, is equally unsuitable for others. For example, when packaging primal meat cuts, it is preferred that the bag including the sealed area, closely conform to the product. Conventional heat sealing, therefor, produces seals that lie some distance from the end of the product and are relatively straight loose fitting seals.

Another method of closing bags and one that sets the sealed area to more closely conform to the product involves the application of a formable metal band about the gathered end of the bag. A band or clip can be applied to the gathered end of the bag in close proximity to the bagged product. With the development of clip applying devices and suitable clips, it is possible to quickly obtain reliable seals. Several problems exist in connection with such sealing, however. The most serious problem is fracture of the container in the clipping process.

Attempts to overcome this problem have been made in the prior art. One such attempt is described in U.S. Pat. No. 3,111,794 to Spolsino. The process described within this patent is directed to a process of fusing a bag end into a solid unitary mass. Another such technique is described in U.S. Pat. No. 3,358,905 wherein a thermoplastic ring is placed around a skein type bag ending and the ending and skein fused into a solidified mass.

While these prior art techniques form satisfactory container closures the time consumed for forming such closures is inordinately long.

SUMMARY OF THE INVENTION

It is thus an object of this invention to provide a new process for forming a container closure.

It is a further object of this invention to provide a novel process for forming a closure from thermoplastic material by unifying the thermoplastic material into a unitary mass in a rapid and efficient manner.

These, as well as other objects are accomplished by the use of microwave energy for heating and unifying a thermoplastic film into a unitary mass.

DETAILED DESCRIPTION

Figure 1:
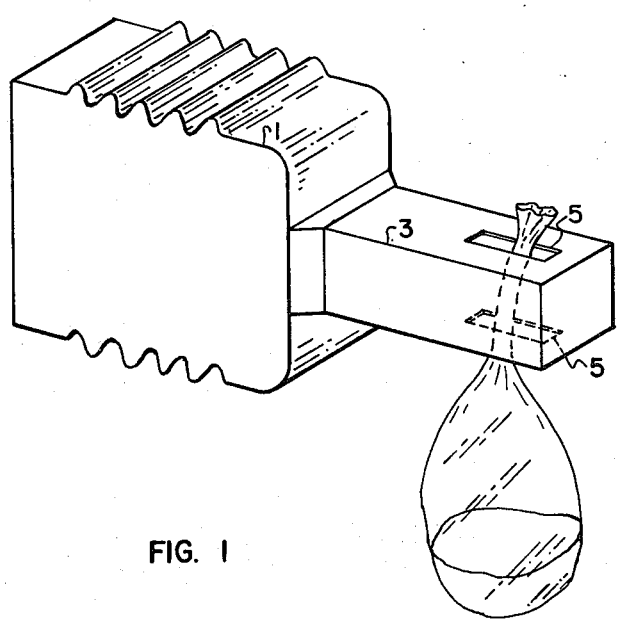
FIG. 1 illustrates in schematic form a container being closed utilizing microwave energy in accordance with this invention.

In accordance with this invention it has been found that film material may be unified into a unitary mass effective for a container closure. Simply stated the process of this invention comprises merely gathering or forming a skein or rope type configuration from film material and exposing the film material to a source of microwaves. Preferably this comprises inserting the skein thus formed into a rectangular microwave guide at a point of high electrical field intensity. It has been surprisingly found that extremely effective closures are rapidly and efficiently formed upon being subjected to microwave energy. Such closures can generally be formed within a period of about 2 to 5 seconds upon exposure to the source of microwaves.

Heretofore it had been felt that microwaves were unsuitable for the formation of unitary masses in film material because of the ability of film material to dissipate heat at a rate which is comparable to the rate of absorption. Another problem associated with the use of microwaves has been the sinusoidal nature of the wave function which results in non uniform absorption of energy. In accordance with this invention, however, it has been found that the gathering of the film material into a compact configuration, such as a skein, and placing the compact configuration into a microwave peak circumvents these problems and produces a highly efficient process for the formation of a unified mass from film material.

As used within this disclosure, the terms "microwave" and "microwave energy" refer to electromagnetic radiation which occurs at the shorter wave lengths of the radio wave region and which has a slightly longer wave length than the far infrared waves. There is no sharp distinction between the radio wave spectrum and infrared spectrum. Broadly stated microwaves occur within the wave length range of 100 to 0.1 centimeters. Preferably the microwaves are at a frequency of about 2450 megahertz which is the frequency reserved for industrial, scientific and medical uses of the shorter radio waves. This corresponds to a wave length of about 12 centimeters. It is, however, understood that any microwave wave length will operate to produce an effective end closure.

Any conventional technique for generating microwaves may be utilized in this invention. Such well known generators as klystrons, magnetrons, and traveling wave oscillators may be utilized with this invention. The power output of such generators may be varied in accordance with the size of the gathered of skein portion which is subjected to the microwave energy. The output may vary from a few microwatts to the kilowatt range. Generally an average power output of about 1 kilowatt is satisfactory for rapidly and efficiently unifying a skein formed from a conventional plastic container.

Any conventional plastic packaging material may be utilized within the process of this invention. While not meant to be an exclusive listing of packaging materials which come within the scope of this invention, the following commonly utilized packaging materials are specifically contemplated as being useful within the scope of this invention: polymers of olefins, particularly the 1-mono-olefins, such as ethylene, propylene, and butylene polymers and copolymers; copolymers of ethylene and vinyl esters, particularly ethylene vinyl acetate copolymers; polyvinylidene chloride-vinyl chloride copolymers commonly referred to as saran; polymers of vinyl chloride; copolymers of propylene and ethylene; polymers of styrene, polyesters, ionomers and polyamides. The term polymer as used herein is used broadly to cover homopolymers, copolymers and terpolymers.

A particularly advantageous aspect of this invention is that materials which are not strictly thermoplastics such as crosslinked polymers and copolymers may be bonded into a unitary mass by the process of this invention whereas direct application of heat energy will not necessarily result in fusion bonding. Particularly within the purview of this invention are irradiated crosslinked polymers of ethylene as well as crosslinked copolymers of ethylene with other monomers such as vinyl acetate. Multilayer structures as well as single film structures seal under the influence of microwaves to a unitary mass within the scope of this invention.

It is felt that the advantages of the sealing technique of this invention result from the internal heating effect of the microwaves. Internal heating is particularly advantageous when considering the time required for heat transmission in prior art heat sealing techniques. It is further felt that microwaves promote bonding or sealing by mechanisms other than fusion such as by diffusion so as to produce seals of superior quality.

Figure 2:
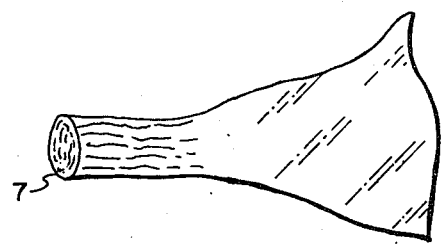
FIG. 2 illustrates a container closure formed in accordance with this invention.

This invention may be more readily understood by reference to the figures of drawing. FIG. 1 illustrates a source of microwave energy 1 such as a magnetron coupled to a rectangular waveguide 3 having an opening 5 therein for the insertion of the container end portion. The proper location for the opening 5 along the waveguide 3 is readily determined by conventional techniques of finding energy points of maximization. This can be accomplished by placing a strip of thermoplastic material through a slot, such as 5, along the length of the waveguide, applying microwave energy and observing the thus treated thermoplastic material. Points of high microwave intensity will show greater melting than the node portions thereof. Upon determination of an energy maximum within the waveguide the insertion port 5 is appropriately placed. A unified container closure 7 produced by microwaves is illustrated in FIG. 2 of the drawing. Such areas of high microwave intensity may also be calculated from a knowledge of the microwave wavelength and the distance from microwave source.

The process is preferably carried out by twisting the container opening into a skein or rope configuration and placing such configuration into the waveguide. The process, however, may also be carried out by gathering the bag end into compact configuration and placing the gathered portion into a waveguide. The compact configuration may be provided by variety of techniques such as by pleating, twisting to form a skein or by simply gathering. An important aspect of the gathering step is that the film material be compressed into a mass having a sufficient volume to surface ratio to absorb microwave energy at a rate significantly greater than the ability to dissipate heat. Generally a skein or gathered portion having an effective diameter of about ¼ inch (0.6 cm) is sufficient for this purpose. The ¼ inch (0.6 cm) diameter, however, is given merely for purposes of illustration; it being understood that smaller and larger diameters may be utilized within the scope of this invention.

The step of forming a compact configuration serves the dual purpose of reducing the surface to volume ratio and of decreasing the effectively exposed area to an area which is small compared to the microwave wavelength. Thus a wavelength of 10 centimeters is quite effective for sealing a compact configurate having an effective diameter of 0.6 centimeters. The gathered portion should not have an effective diameter of greater than one-half wavelength unless provisions are made for either moving the gathered portion or shifting the wave to ultimately expose the entire effective diameter to high microwave intensity. Preferably, however, the compact configuration will have an effective diameter of less than ¼ of a wavelength. The term effective diameter as used herein means the width of the surface exposed to microwave radiation and which is transverse to the direction of microwave propagation.

If containers having a substantial excess of bag material are being utilized, it is contemplated that the terminal portion of a container may be passed completely through a waveguide so as to form a unified mass on the material within the waveguide followed by the step of severing the material at some point along the unified mass. From this it is further contemplated that a single casing may be made into two containers by sealing the central portion of the casing and severing the casing into two containers along the seal area. These details, however, are subject to wide variation.

Figure 3:
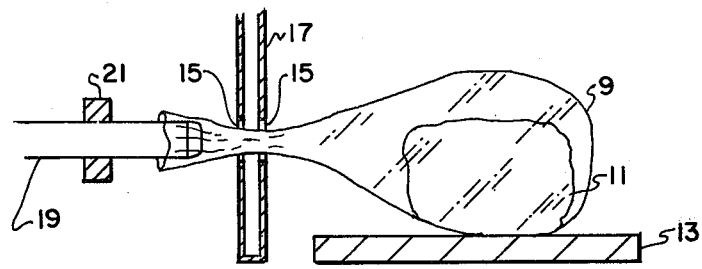
FIGS. 3 and 4 illustrate an apparatus for carrying out the process of this invention.
Figure 4:
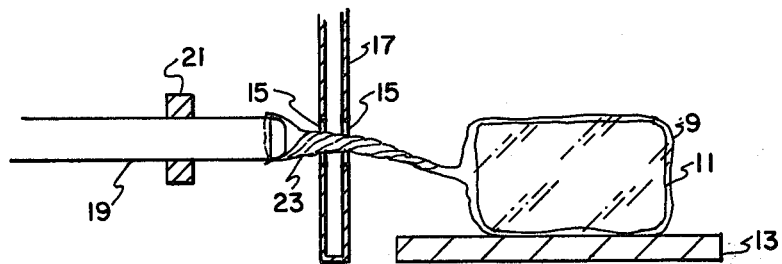

A particular application of the process of this invention is illustrated in FIG. 3 of the drawings. As illustrated therein a flexible package 9 contains an article 11 resting upon surface 13. The container 9 passes through a slot 15 in waveguide 17. The container 9 is in communication with an evacuation source through nozzle 19, such that the container 9 may be evacuated through nozzle 19 so as to protect and insulate the article 11 from deleterious exposure to atmosphere. The nozzle 19 is connected to a source of rotation 21 which upon completion of evacuation rotates to form a skein within the slot portion 15. This aspect is illustrated in FIG. 4 of the drawings. As is shown therein after rotation of nozzle 19 by rotation source 21 a skein 23 resides within the waveguide 17 for unification thereof by the application of microwave energy.

It is also contemplated that evacuation and sealing may be carried out in a vacuum chamber of the type disclosed in U.S. Pat. No. 3,832,824 to Burrell. It is further contemplated that nozzles with a source of rotation may be incorporated into such a chamber for forming a skein and that waveguides exist within the chamber for forming seals therein. Such seals may be formed on the two ends of a casing simultaneously. It is further apparent that more than one container be evacuated and sealed simultaneously within a single chamber.

As an example of the process of this invention microwave energy at a frequency of 2,450 megahertz was utilized for forming a closure on a container of the type described in U.S. Pat. No. 3,741,253 to Harri J. Brax et al. The multilayer film forming the container had a thickness of about 3 mils (75 micrometers) and was formed from a tubular configuration having a diameter of about 6 inches. The end portion of the container was twisted into a skein having a diameter of approximately ¼ inch. About one-half inch of the skein was inserted into a rectangular waveguide having a cross section dimension of four inches by two inches. A magnetron source of microwave energy having a maximum power output of 1,000 watts was utilized in the example. After insertion of the skein portion into the waveguide, the power level was increased rapidly from 0 to 800 watts and back to 0 watts. The total elapsed time was between three and four seconds. At the end of the applied application of energy an attractive and unitary seal such as that shown in FIG. 2 of the drawings resulted. Pressure tests on the seal indicated ability to withstand pressures equal to or greater than that withstood by clip seals without the fracture problems of clips.

It is thus seen that the process of this invention rapidly and efficiently produces a unitary closure from film material in a manner neither contemplated nor taught by the prior art. While many specific illustrations of this invention have been given in the foregoing description such illustrations are for such purposes of description rather than limitation. The spirit and scope of this invention is to be determined by the following appended claims.

What is claimed is:

1. A process for cohering film material comprising:
   gathering said film material into a compact configuration;
   placing said compact configuration within a standing wave guide;
   subjecting said compact configuration within said wave guide to microwave energy for a period of time sufficient to unify the film material within said compact configuration, said compact configuration having an effective diameter of less than one-half the wavelength of said microwave energy.

2. The process according to claim 1 wherein said step of gathering comprises twisting said film material into a skein.

3. The process according to claim 1 wherein said microwave energy has a wave length of from 100 to 0.10 of a centimeter.

4. The process according to claim 1 wherein said microwave energy is at a frequency of 2,450 megahertz.

5. The process according to claim 1 wherein said film material is in the form of a container.

6. The process according to claim 1 wherein said film material is comprised of a polymer of an olefin.

7. The process according to claim 6 wherein said olefin polymer is polyethylene.

8. The process according to claim 1 wherein said material is a material selected from a group consisting of olefin polymers, copolymers of olefins, copolymers of vinylidene chloride and vinyl chloride, polymers of amides, styrene polymers, and copolymers of ethylene and vinyl esters.

9. A process of packaging comprising:
   placing an article within a flexible container;
   gathering the opening of said container into a compact configuration;
   placing said compact configuration within a standing wave guide; and
   subjecting said compact configuration within said wave guide to a source of microwave energy for a period of time sufficient to unify said compact configuration into a unitary closure, said compact configuration having an effective diameter of less than one-half the wavelength of said microwave energy.

10. The process according to claim 9 wherein said step of gathering comprises twisting the container opening to form a skein configuration.

11. The process according to claim 9 further including the step of evacuating said container prior to said step of gathering.

* * * * *